US011740087B2

(12) United States Patent
Harada et al.

(10) Patent No.: US 11,740,087 B2
(45) Date of Patent: Aug. 29, 2023

(54) INERTIAL SENSOR

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Shota Harada, Nisshin (JP); Keitaro Ito, Nisshin (JP); Katsuaki Goto, Nisshin (JP); Yuuki Inagaki, Nisshin (JP); Takahiko Yoshida, Nisshin (JP); Yusuke Kawai, Nisshin (JP); Teruhisa Akashi, Nisshin (JP); Hirofumi Funabashi, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 0 days.

(21) Appl. No.: 17/703,164

(22) Filed: Mar. 24, 2022

(65) Prior Publication Data

US 2022/0316880 A1 Oct. 6, 2022

(30) Foreign Application Priority Data

Mar. 30, 2021 (JP) ................................ 2021-057614

(51) Int. Cl.
*G01C 19/56* (2012.01)
*G01S 19/47* (2010.01)

(52) U.S. Cl.
CPC ............. *G01C 19/56* (2013.01); *G01S 19/47* (2013.01)

(58) Field of Classification Search
CPC ................................................. G01C 19/5691
See application file for complete search history.

(56) References Cited

U.S. PATENT DOCUMENTS 4,951,508 A * 8/1990 Loper, Jr. ........... G01C 19/5691 73/1.84
9,103,675 B2 * 8/2015 Vandebeuque .... G01C 19/5691
(Continued)

FOREIGN PATENT DOCUMENTS

CN 110749315 A 2/2020

OTHER PUBLICATIONS

U.S. Appl. No. 17/703,418, filed Mar. 24, 2022, Ito et al.
(Continued)

*Primary Examiner* — Paul M. West
*Assistant Examiner* — Mark A Shabman
(74) *Attorney, Agent, or Firm* — POSZ LAW GROUP, PLC

(57) ABSTRACT

A micro vibration body includes a curved surface portion, a recessed portion recessed from the curved surface portion, a bottom surface protruding portion protruding from a bottom surface of the recessed portion, and a through hole in the bottom surface protruding portion. A mounting substrate has a positioning recess, into which the bottom surface protruding portion is inserted, and electrode portions surrounding the inner frame portion. A joining member is in the positioning recess and joins the bottom surface protruding portion with the mounting substrate. The bottom surface is in contact with a region of the mounting substrate around the positioning recess. The bottom surface protruding portion has a tip end surface that is at a distance from the positioning recess. The joining member at least partially enters the through hole and is electrically connected to the conductive layer.

5 Claims, 14 Drawing Sheets

(56) References Cited

U.S. PATENT DOCUMENTS

| | | | | |
|---|---|---|---|---|
| 9,796,586 | B2 * | 10/2017 | Najafi | B22D 25/02 |
| 2010/0083758 | A1 * | 4/2010 | Vandebeuque | G01C 19/5691<br>310/300 |
| 2013/0160578 | A1 * | 6/2013 | Najafi | G01C 19/5691<br>74/5.6 D |
| 2018/0188030 | A1 * | 7/2018 | Shang | B81C 1/00269 |
| 2019/0094024 | A1 * | 3/2019 | Najafi | H03H 3/0072 |

OTHER PUBLICATIONS

Tal Rove Nagourney, "High-Q Fused Silica Micro-Shell Resonators for Navigation-Grade MEMS Gyroscopes." 2018. University of Michigan PhD dissertation.

* cited by examiner

INERTIAL SENSOR

CROSS REFERENCE TO RELATED APPLICATION

The present application claims the benefit of priority from Japanese Patent Application No. 2021-057614 filed on Mar. 30, 2021. The entire disclosures of all of the above applications are incorporated herein by reference.

TECHNICAL FIELD

The present disclosure relates to an inertial sensor that includes a micro vibration body having a curved surface.

BACKGROUND

In recent years, a system for autonomous driving of a vehicle has been developed.

SUMMARY

According to an aspect of the present disclosure, an inertial sensor comprises a micro vibration body and a back surface.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
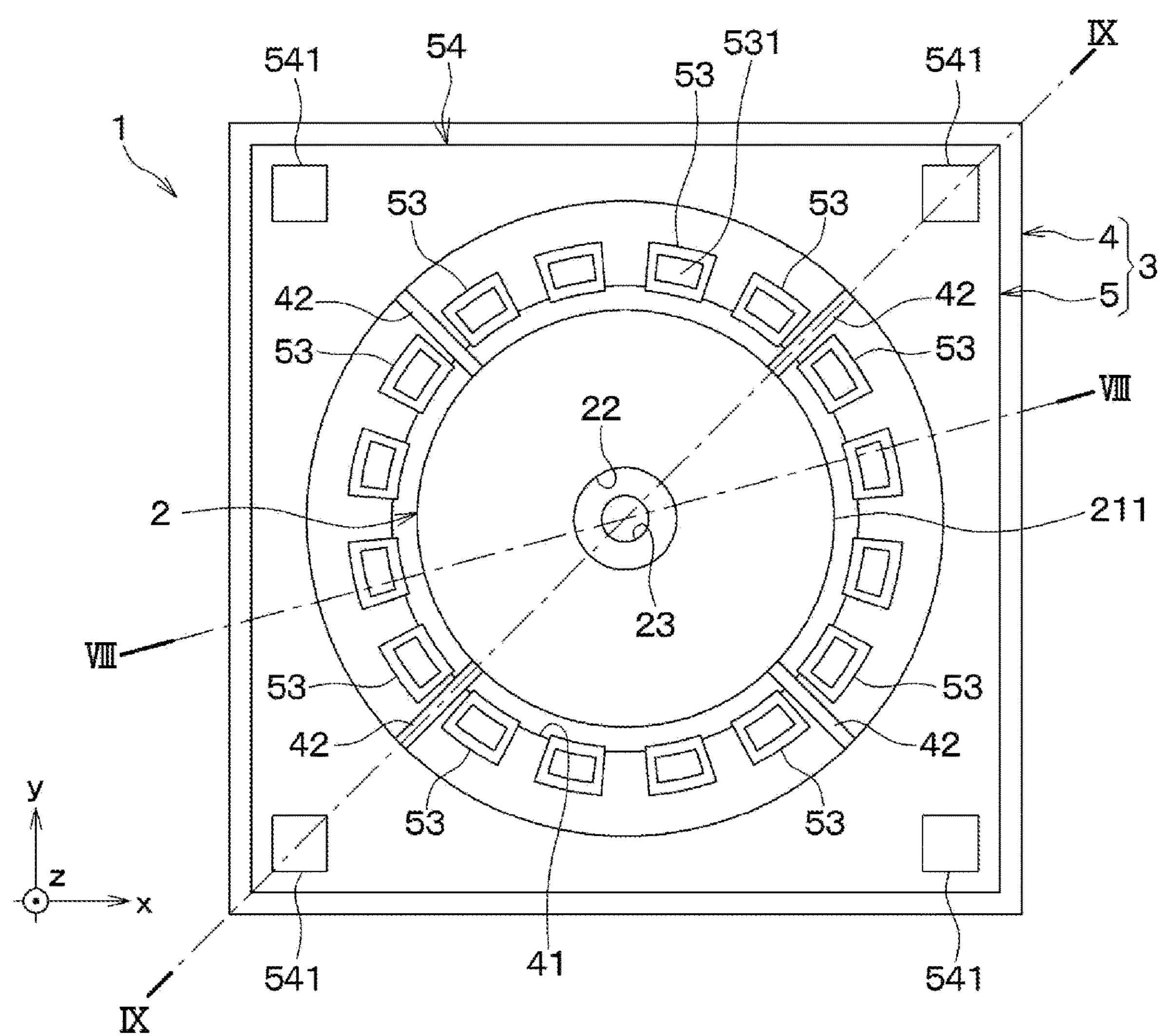
FIG. 1 is a top view showing an inertial sensor according to an embodiment.

Hereinafter, example of the present disclosure will be described.

A system for autonomous driving of a vehicle requires a highly accurate self-position estimation technique.

According to an example of the present disclosure, a self-position estimation system equipped with GNSS (Global Navigation Satellite System) and IMU (Inertial Measurement Unit) are used for so-called level 3 automated driving. The IMU is, for example, a 6-axis inertial force sensor composed of a 3-axis gyro sensor and a 3-axis acceleration sensor. In the future, in order to realize a level 4 or higher autonomous operation, IMU with higher accuracy than the current one is required.

As a gyro sensor for realizing such a high-precision IMU, BRG (Bird-bath Resonator Gyroscope) may be used. The BRG includes a micro vibration body having a three-dimensional curved surface, which vibrates in a wine glass mode, and is mounted on a mounting substrate. This micro vibration body has a Q factor, which represents a vibration state and which reaches $10^6$ or more. Therefore, it is expected that this micro vibration body enables to produce a higher accuracy than a previous configuration.

In order to achieve a high accuracy with the inertial sensor using this micro vibration body, it may be necessary to suppress a decrease in the Q factor of the micro vibration body.

According to an example of the present disclosure, a micro vibration body decreases in the Q factor due to, for example, a state of film formation of an electrode film on the surface, such as a large covering area of a base material with an electrode film. In addition, this micro vibration body decreases in the Q factor when a thin base material (for example, quartz with a thickness of several tens of micrometers) or the electrode film formed on the surface is scratched or is peeled off. Therefore, in order to suppress the decrease in the Q factor, this micro vibration body may be required to be handled without scratching on the mounting board in the mounting process, while improving the film formation state of the electrode film.

The BRG is manufactured, such that a movable jig for positioning a micro vibration body is formed as a part of the mounting board. Further, the micro vibration body is mounted on the mounting board, and the position of the micro vibration body is adjusted with respect to the movable jig. Further, the micro vibration body is joined to the mounting board with a joining member. Thereafter, a portion of the movable jig in the mounting board is released from the mounting board by a process such as etching and is removed.

However, although this method may enable to secure the accuracy of the positioning of the micro vibration body on the mounting board, there are many processes and the manufacturing cost may increase. Further, in the micro vibration body used for this BRG, the electrode film is formed on the entirety of the front and back surfaces, and the film formation state of the electrode film is not preferable from the viewpoint of suppressing the decrease in the Q factor.

According to an example of the present disclosure, an inertial sensor has a structure with an electrode film of a micro vibration body that is configured to vibrate in a wine glass mode. The inertial sensor may facilitate positioning of the micro vibration body with respect to the mounting board with high accuracy, while suppressing decrease in a Q factor.

According to an example of the present disclosure, an inertial sensor comprises a micro vibration body that is a thin-walled member having a front surface, which is a surface on a side having a large outer diameter, and a back surface, which is an opposite surface to the front surface. The micro vibration body includes a curved surface portion, which has an annular curved surface, a recessed portion, which is recessed from the curved surface portion to a side of the back surface, a bottom surface protruding portion, which protrudes from a bottom surface of the recessed portion on a side of the back surface, a through hole, which is in the bottom surface protruding portion and connects the front surface with the back surface, and a conductive layer, which covers at least a part of the front surface. The inertial sensor further comprises a mounting substrate that includes a lower substrate and an upper substrate, which are joined to each other, the lower substrate having a positioning recess into which the bottom surface protruding portion of the micro vibration body is inserted, the upper substrate including a frame portion, which has a frame-shape and surrounds the positioning recess, and a plurality of electrode portions, which are separated from each other and surround the inner frame portion. The inertial sensor further comprises a joining member that is provided in the positioning recess and joins the bottom surface protruding portion of the micro vibration body with the mounting substrate. The curved surface of the micro vibration body is hollow. The bottom surface is in contact with a region of the mounting substrate around the positioning recess. A tip end of the bottom surface protruding portion has a tip end surface on an opposite side to the bottom surface. The positioning recess is at a distance from the tip end surface. The joining member at least partially enters the through hole and is electrically connected to the conductive layer.

According to this, the inertial sensor includes the micro vibration body having the three-dimensional curved surface, the recessed portion, which is recessed from the three-dimensional curved surface, and the bottom surface protruding portion, which protrudes from the bottom surface of the recessed portion. Further, the protruding portion of the bottom surface of the micro vibration body is inserted to the positioning recess of the mounting board. This inertial sensor is positioned by inserting the bottom surface protruding portion of the micro vibration body into the positioning recess portion of the mounting board. Therefore, the inertial sensor has a configuration in which the positioning of the micro vibration body with respect to the mounting board is simple and highly accurate.

Further, in this inertial sensor, the micro vibration body has the through hole in the bottom surface protruding portion and the conductive layer covering the front surface. In addition, a part of the joining member enters the through hole and is electrically connected to the conductive layer. Therefore, it is not necessary to provide an electrode film on the back surface of the micro-vibration body. Therefore, the covering area of the base material of the micro vibration body by the conductive layer is reduced, and the Q factor of the micro-vibration body is improved.

Therefore, in this inertial sensor, the positioning of the micro vibration body with respect to the mounting board is easy and is highly accurate. In addition, the Q factor of the vibration is high, and the configuration is highly accurate.

Hereinafter, embodiments of the present disclosure will be described with reference to the drawings. In the following embodiments, the same reference numerals are assigned to parts that are the same or equivalent to each other to describe the same.

Embodiment

An inertial sensor 1 according to an embodiment will be described with reference to FIGS. 1 to 10B.

Figure 2:
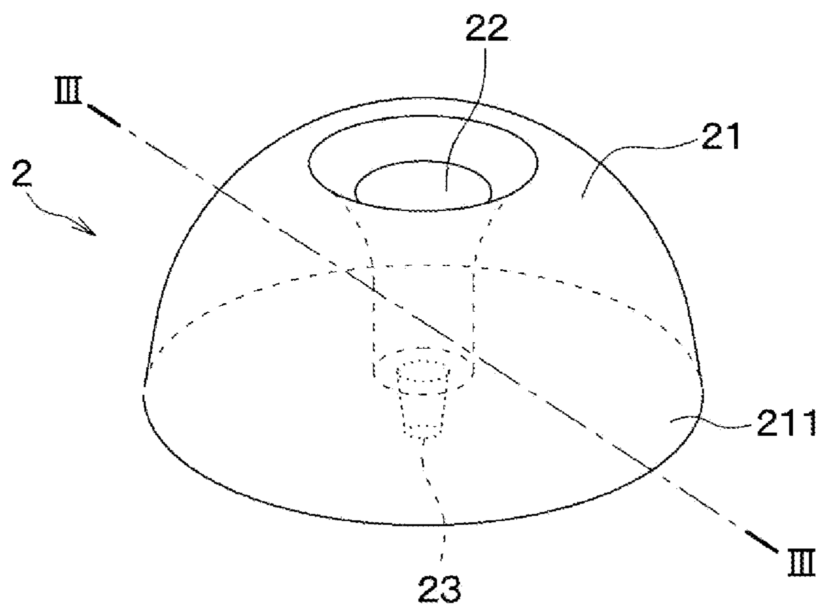
FIG. 2 is a perspective view showing a micro vibration body used in the inertial sensor.

In FIG. 2, in order to facilitate understanding of the configuration of a micro vibration body 2 described later, a portion of an outer shell of the micro vibration body 2, which cannot be seen from an angle shown in FIG. 2, is shown by a broken line.

Hereinafter, for convenience of explanation, as shown in FIG. 1, the direction along the left-right direction in the view is referred to as a "x direction", the direction orthogonal to the x direction in the view is referred to as a "y direction", and the normal direction to the x-y plane is referred to as a "z direction". The x, y, and z directions in the views in FIG. 3 and subsequent drawings correspond to the x, y, and z directions in FIG. 1, respectively. Further, in the present specification, "upper" represents a direction along the z direction in the view and represents a direction along the arrow, and "lower" represents the opposite direction to the upper. Further, in the present specification, for example, as shown in FIG. 1, a state in which the inertial sensor 1 or a mounting substrate 3 is viewed from the upper side in the z direction may be referred to as "top view".

(Fundamental Configuration)

As shown in FIG. 1, the inertial sensor 1 includes, for example, the micro vibration body 2 and the mounting substrate 3. A part of the micro vibration body 2 is joined to the mounting substrate 3. The inertial sensor 1 is configured to detect an angular velocity applied to the inertial sensor 1 based on a change in capacitance between the micro vibration body 2, which is thin-walled and configured to vibrate in a wine glass mode, and a plurality of electrode portions 53 of the mounting substrate 3 which will be described later. The inertial sensor 1 is, for example, a gyro sensor having a BRG structure, and may be suitable for applications to be mounted on vehicles such as automobiles, nevertheless, the device may also be applied to other applications.

For example, as shown in FIG. 2, the micro vibration body 2 includes a curved surface portion 21 having an outer shape of a substantially hemispherical three-dimensional curved surface, a recessed portion 22 recessed from a top side of the curved surface portion 21 in the substantially hemispherical shape toward the center side of the hemispherical shape, and a bottom surface protruding portion 23 protruding from the recessed portion 22 so as to be further recessed toward the center. In the micro vibration body 2, for example, the curved surface portion 21 has a bowl-shaped three-dimensional curved surface. The micro vibration body 2 exhibits a Q factor of vibration that is $10^5$ or more. The end of the curved surface portion 21 opposite to the recessed portion 22 is a rim 211. The rim 211 has, for example, a substantially tubular shape. The micro vibration body 2 is mounted on the mounting substrate 3, such that a front surface 2*a* of the rim 211 faces the plurality of electrode portions 53 of the mounting substrate 3, which will be described later, and such that the plurality of electrode portions 53 are evenly spaced therebetween.

Figure 3:
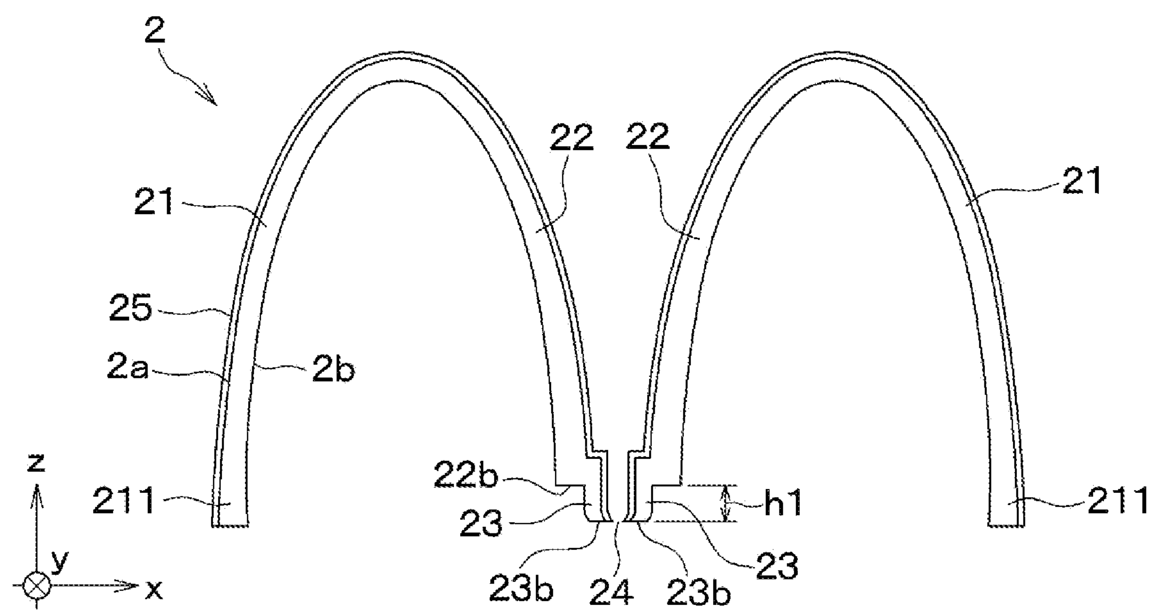
FIG. 3 is a cross-sectional view showing a configuration of a cross-section taken along a line III-III in FIG. 2.

For example, as shown in FIG. 3, the micro vibration body 2 has a front surface 2*a*, which has a larger outer diameter, and a back surface 2*b* on the opposite side of the front surface 2*a*. On the side of the back surface 2*b*, the bottom surface protruding portion 23 protrudes from a bottom surface 22*b* of the recessed portion 22. That is, the micro vibration body 2 is in a shape such that, when viewed from the back surface 2*b*, the recessed portion 22 is a first recessed portion, which protrudes from the curved surface portion 21, and the bottom surface protruding portion 23, which protrudes from a tip end of the recessed portion 22, is a second recessed portion. In the micro vibration body 2, the outer diameter of the bottom surface protruding portion 23 on the side of the back surface 2*b* is smaller than the outer diameter of the recessed portion 22. In the micro vibration body 2, the bottom surface protruding portion 23 is a joining portion which is joined to the mounting substrate 3. The micro vibration body 2 is a portion, which is in a hollow state such that the curved surface portion 21 including the rim 211 is not in contact with another member, when being mounted on the mounting substrate 3. The micro vibration body 2 has a structure in which the hollow rim 211 is configured to vibrate in a wine glass mode when mounted on the mounting substrate 3.

The micro vibration body 2 has a through hole 24, which connects the front surface 2*a* with the back surface 2*b*, at, for example, a bottom of the bottom surface protruding portion 23 when viewed from the front surface 2*a*, that is, at a tip end when viewed from the back surface 2*b*. For example, the entirety of the front surface 2*a* of the micro vibration body 2 is covered with a conductive layer 25. On the other hand, the back surface 2*b* of the micro vibration body 2 is not formed with the conductive layer 25, and the thin base material thereof is exposed.

The conductive layer 25 is formed of, for example, but not limited to, a laminated film of a conductive material such as Cr (chromium) or Ti (titanium) and Au (gold) or Pt (platinum) from the side of the base material. The conductive layer 25 serves as an electrode film. The conductive layer 25 is formed as a film on the front surface 2*a* of the micro vibration body 2 by, for example, a vacuum film forming method such as sputtering or thin film deposition. On the other hand, the conductive layer 25 is not formed on the back surface 2*b*. As a result, in the micro vibration body 2, decrease in the vibration Q factor is suppressed as compared with a case where the electrode film is formed on both the front surface and the back surface. In the present embodiment, the conductive layer 25 covers the entire wall surface of the bottom surface protruding portion 23 including the inner wall of the through hole 24 on the side of the front surface 2*a*. When a joining member 52 enters the through hole 24 and is solidified, the conductive layer 25 is configured to be electrically connected to the joining member 52.

A protruding dimension of the bottom surface protruding portion 23 on the side of the back surface 2*b* is defined as a "height h1 of the bottom surface protruding portion 23". The height h1 is sized so that the surface of the tip end of the bottom surface protruding portion 23 does not make contact with the mounting substrate 3. Further, the micro vibration body 2 has a configuration such that the bottom surface protruding portion 23 is inserted into a positioning recess 43 of the mounting substrate 3, which will be described later, so that the micro vibration body 2 can be easily and highly accurately positioned with respect to the mounting substrate 3. In the micro vibration body 2, the bottom surface 22*b* of the recessed portion 22 is an abutting portion that abuts on an area around the positioning recess 43 of the mounting substrate 3 when being mounted on the mounting substrate 3. The details of this structure will be described later.

Figure 8:
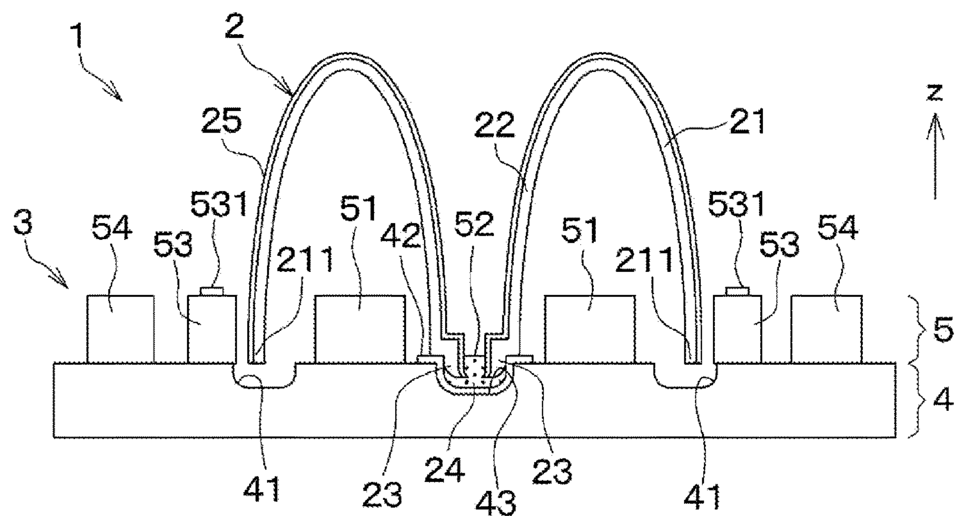
FIG. 8 is a cross-sectional view showing a configuration of a cross-section taken along a line VIII-VIII in FIG. 1.

The micro vibration body 2 has the through hole 24 formed at the bottom of the bottom surface protruding portion 23. Therefore, when being mounted on the mounting substrate 3, for example, as shown in FIG. 8, the micro vibration body 2 is in a shape such that the joining member 52 is enabled to flow from the side of the back surface 2*b* toward the front surface 2*a* of the bottom surface protruding portion 23 through the through hole 24. As a result, the micro vibration body 2 is electrically connected to the mounting substrate 3 via the joining member 52 that has flowed into the through hole 24, even though the back surface 2*b* does not have the conductive layer 25.

The micro vibration body 2 is made of, for example, glass, which contains additives such as quartz and borosilicate glass, metallic glass, and/or a material such as silicon and ceramics. The micro vibration body 2 may be a component that is configured to form the curved surface portion 21, which has a three-dimensional curved surface shape, the recessed portion 22, and the bottom surface protruding portion 23, and is configured to vibrate in the wine glass mode. The micro vibration body 2 is not limited to be formed of the above-described material. The micro vibration body 2 is formed by processing a thin-walled base material made of the above-described material by, for example, a forming process described later. As a result, the micro vibration body 2 is formed such that the curved surface portion 21, the recessed portion 22, and the bottom surface protruding portion 23 have a thickness of 10 μm to 100 μm, which is a thin member on the order of micrometer. The micro vibration body 2 has a shape in a millimeter-size such that, the micro vibration body 2 is 2.5 mm in a height direction and the outer diameter of the micro vibration body 2 on the side of the front surface 2*a* of the rim 211 is 5 mm, for example. The height direction is along the thickness direction of the mounting substrate 3.

Figure 4A:
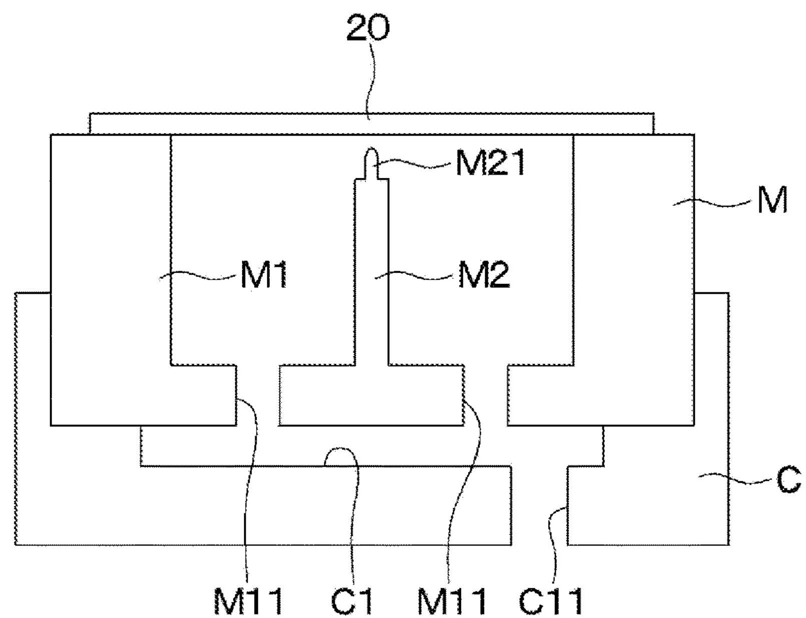
FIG. 4A is a view showing a process for preparing a member in a process of forming a micro vibration body.

The micro vibration body 2 is formed by, for example, the following process. First, for example, as shown in FIG. 4A, a quartz plate 20, a mold M for forming the shape of the three-dimensional curved surface, and a cooling body C for cooling the mold M are prepared. The mold M has, for example, a recessed portion M1, which forms a space for forming the shape of the three-dimensional curved surface on the quartz plate 20, and a support portion M2, which is at the center of the recessed portion M1 and extends along a depth direction of the recessed portion M1 and supports a part of the quartz plate 20 during the process. The mold M is formed with a through hole M11, which is formed in a bottom surface of the recessed portion M1, and a protrusion M21, which is formed on a tip end surface of the support portion M2. The cooling body C has a fitting portion C1, into which the mold M is fitted, and an exhaust port C11, which is formed on the bottom of the fitting portion C1 and is used for exhaust. The cooling body C is configured to cool the mold M when the quartz plate 20 is processed. The quartz plate 20 is arranged so as to cover an entire area of the recessed portion M1 of the mold M.

Figure 4B:
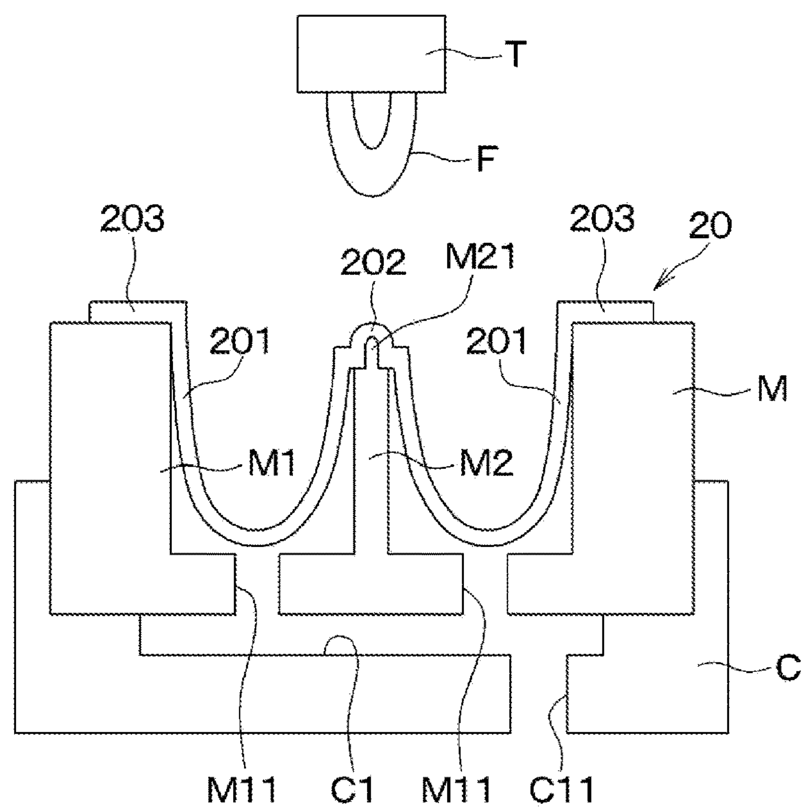
FIG. 4B is a view showing a process following the process of FIG. 4A.

Then, for example, as shown in FIG. 4B, a flame F is applied from a torch T toward the quartz plate 20 to melt the quartz plate 20. At this time, the recessed portion M1 of the mold M is evacuated through the exhaust port C11 of the cooling body C by a vacuum mechanism (not shown). As a result, the melted portion of the quartz plate 20 is stretched toward the bottom surface of the recessed portion M1. In addition, a central peripheral region of the melted portion of the quartz plate 20 is supported by the support portion M2. After that, the heating of the quartz plate 20 is stopped, and the quartz plate 20 is cooled. Thus, in the quartz plate 20, a curved surface part 201, which has the substantially hemispherical three-dimensional curved surface shape, and a recessed part 202, which is recessed at the portion near the center of the curved surface part 201 along the outer shape of the protrusion M21, are formed. Further, a portion of the quartz plate 20, which is located on the outside of the recessed portion M1, becomes an end portion 203, which is located at the outer peripheral edge of the curved surface part 201 and has a flat shape.

Figure 4C:
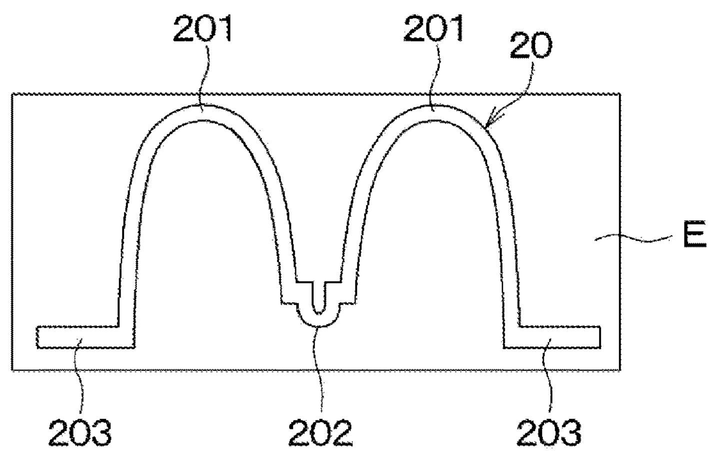
FIG. 4C is a view showing a process following the process of FIG. 4B.
Figure 4D:
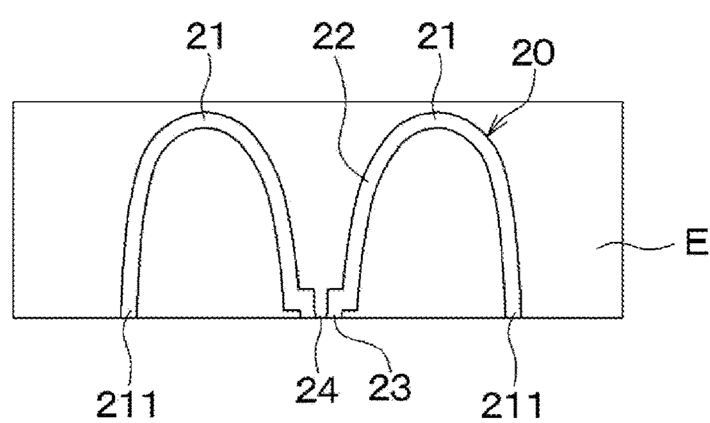
FIG. 4D is a view showing a process following the process of FIG. 4C.

Subsequently, the recessed portion M1 of the mold M is returned to be in a state of normal pressure, and the processed quartz plate 20 is removed. As shown in FIG. 4C, the quartz plate 20 is sealed with, for example, a sealing material E, which is made of a curable resin material. Then, as shown in FIG. 4D, the sealing material E is, for example, polished and is applied with CMP (Chemical Mechanical Polishing) from the surface on the side of the end portion 203. In this way, the sealing material E together with the end portion 203 and the tip end of the recessed part 202 are removed.

As a result, the quartz plate 20 has a shape having the curved surface portion 21 in the annular curved surface, the recessed portion 22 recessed from the tip end of the curved surface portion 21, the bottom surface protruding portion 23, and the through hole 24.

Figure 4E:
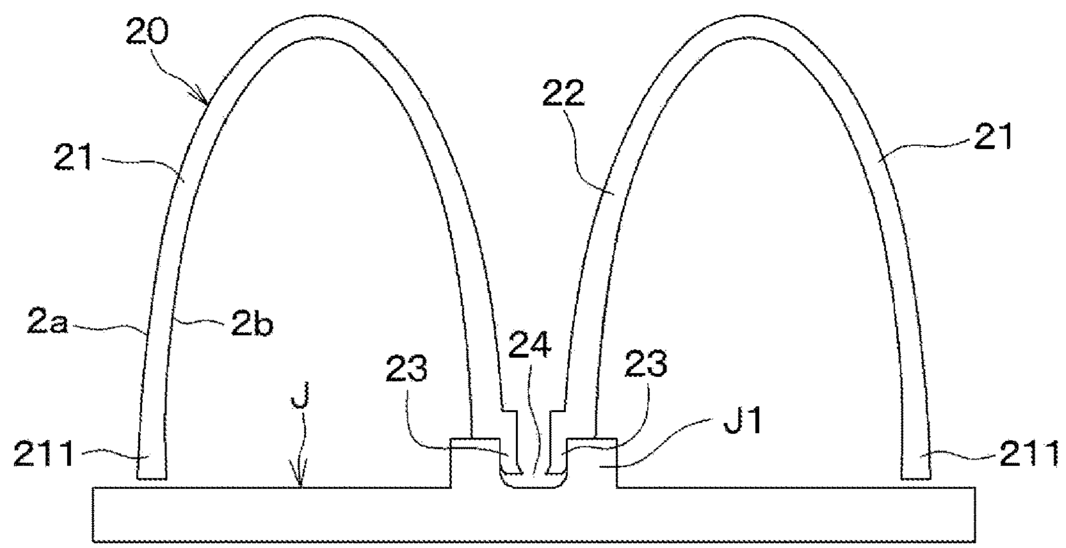
FIG. 4E is a view showing a process following the process of FIG. 4D.

Then, all the sealing material E is removed by a method such as heating or melting using a chemical solution, and the quartz plate 20 is taken out. Subsequently, for example, as shown in FIG. 4E, a jig J having a recessed portion J1 having an inner diameter corresponding to the outer diameter of the bottom surface protruding portion 23 of the quartz plate 20 is prepared, and the quartz plate 20 taken out from the sealing material E is set on the jig J. Finally, the conductive layer 25 is formed on a front surface 20*a* of the quartz plate 20 by, for example, a film forming process such as sputtering or thin film deposition, after the above-described process. As a result, in the quartz plate 20, the front surface 20*a* on the side having a large outer diameter is covered with the conductive layer 25, and a back surface 20*b* on the opposite surface is exposed.

Figure 4F:
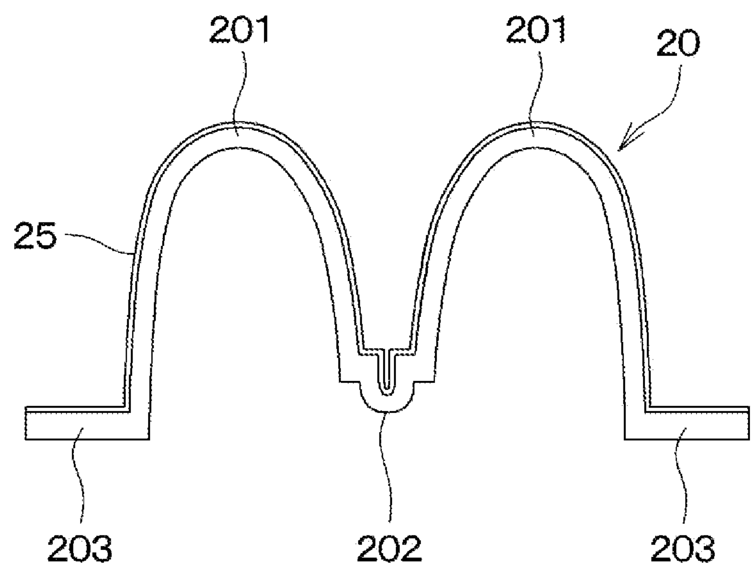
FIG. 4F is a view showing another example of a method for forming the micro vibration body and showing a process of forming a conductive layer.
Figure 4G:
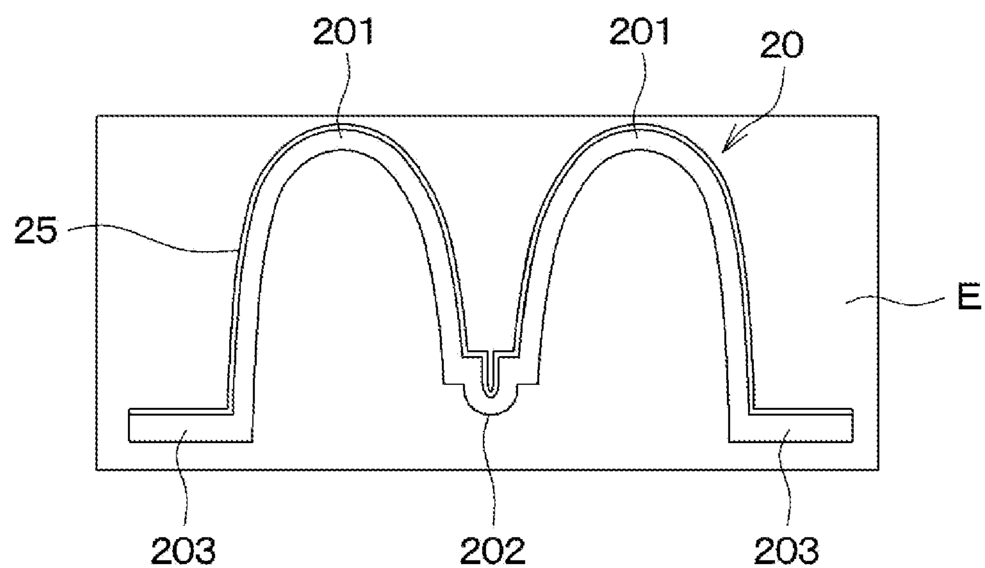
FIG. 4G is a view showing a process following the process of FIG. 4F.

The micro vibration body 2 is manufactured by, for example, the manufacturing process as described above, but is not limited to this example of the manufacturing method. For example, the heat source for melting the quartz plate 20 shown in FIG. 4B may be, instead of the flame F by the torch T, a heater, which is configured to heat the quartz plate 20 in the same area as when the flame F is used. Further, the micro vibration body 2 may be manufactured, for example, as shown in FIG. 4F, through a process of forming the conductive layer 25 on the outer surface of the quartz plate 20 in a state where the end portion 203 remains, after the process shown in FIG. 4B. In this case, the micro vibration body 2 is formed, as shown in FIG. 4G, through a process in which the quartz plate 20, on which the conductive layer 25 is formed, is sealed with the sealing material E, subsequently, the end portion 203 is removed by polishing and CMP, and the sealing material E is finally removed. In this case, the quartz plate 20 may be fixed by using the end portion 203, which is to be removed later, without using the jig J. In addition, the quartz plate 20 may be rotated in the vacuum film formation of the conductive layer 25, thereby to enable to further suppress variations in the film formation of the conductive layer 25. Further, the through hole 24 of the micro vibration body 2 may be formed by a method other than the polishing. For example, the micro vibration body 2 may be formed such that the quartz plate 20, which is in a flat plate shape and has a through hole 24 formed in advance in a portion located on the tip end of the protrusion M21 of the mold M may be prepared in the process shown in FIG. 4A, and may be formed through the process in and after FIG. 4B. As described above, the manufacturing process of the micro vibration body 2 may be appropriately changed, and other known methods may be adopted.

Further, in this example, the micro vibration body 2 has a substantially half-toroidal shape that is rotationally symmetric with the Z direction as the axis of rotation. The micro vibration body 2 may have a shape that is configured to vibrate in the wine glass mode and is not limited to the shape of the BR shown in the drawings.

Figure 5:
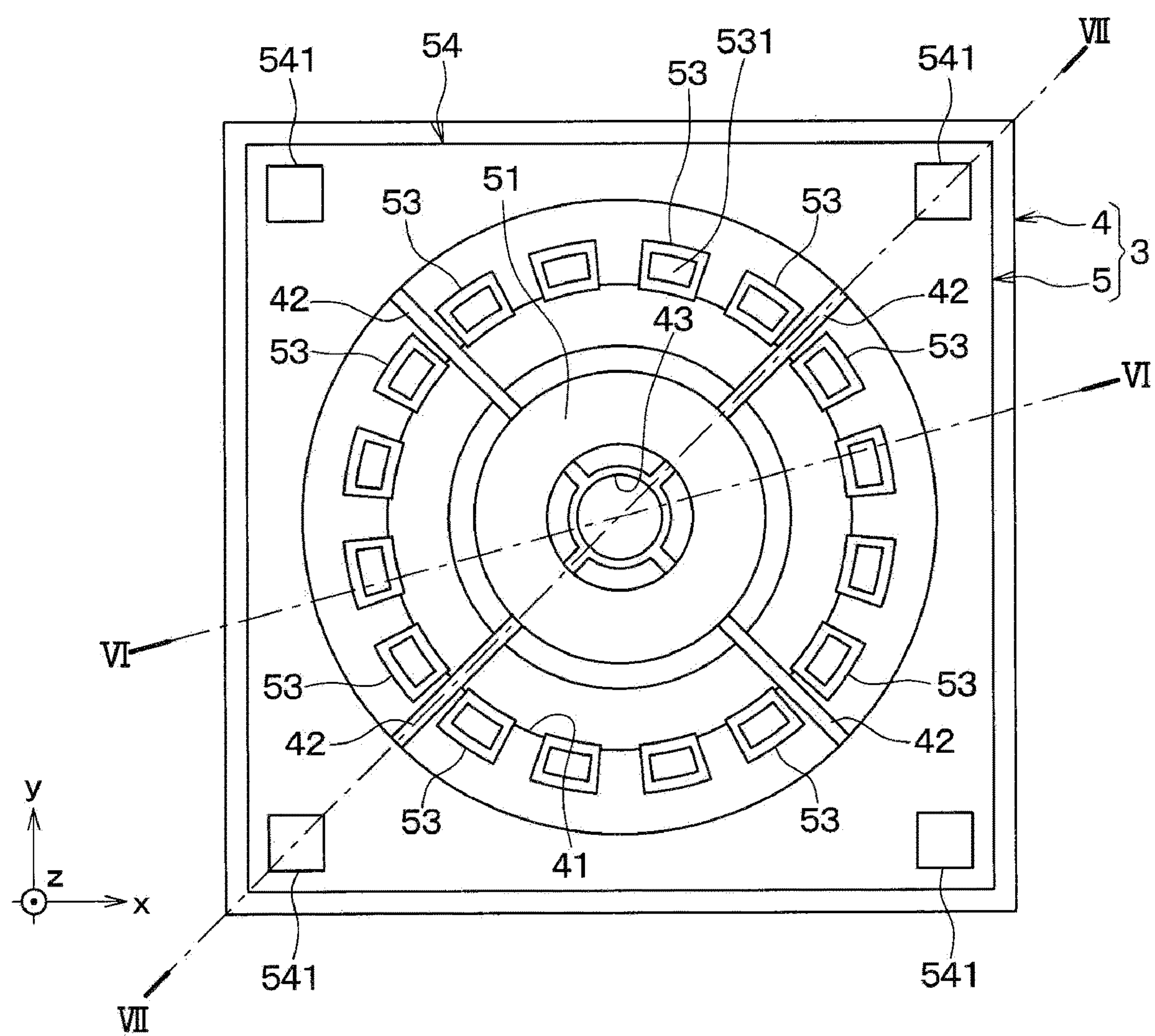
FIG. 5 is a top view showing a mounting substrate on which the micro vibration body of FIG. 2 is mounted.

As shown in FIG. 5, for example, the mounting substrate 3 includes a lower substrate 4 and an upper substrate 5, which are joined to each other. For example, the mounting substrate 3 is formed by anodical bonding the upper substrate 5, which is formed of a semiconductor material Si (silicon), to the lower substrate 4, which is formed of borosilicate glass, which is an insulating material. The lower substrate 4 of the mounting substrate 3 includes the positioning recess 43, on which the micro vibration body 2 is mounted, an inner frame portion 51, which surrounds the positioning recess 43, the plurality of electrode portions 53, which is arranged apart from each other so as to surround the inner frame portion 51, and an outer frame portion 54, which is arranged apart from each other so as to surround the electrode portions 53.

Figure 9:
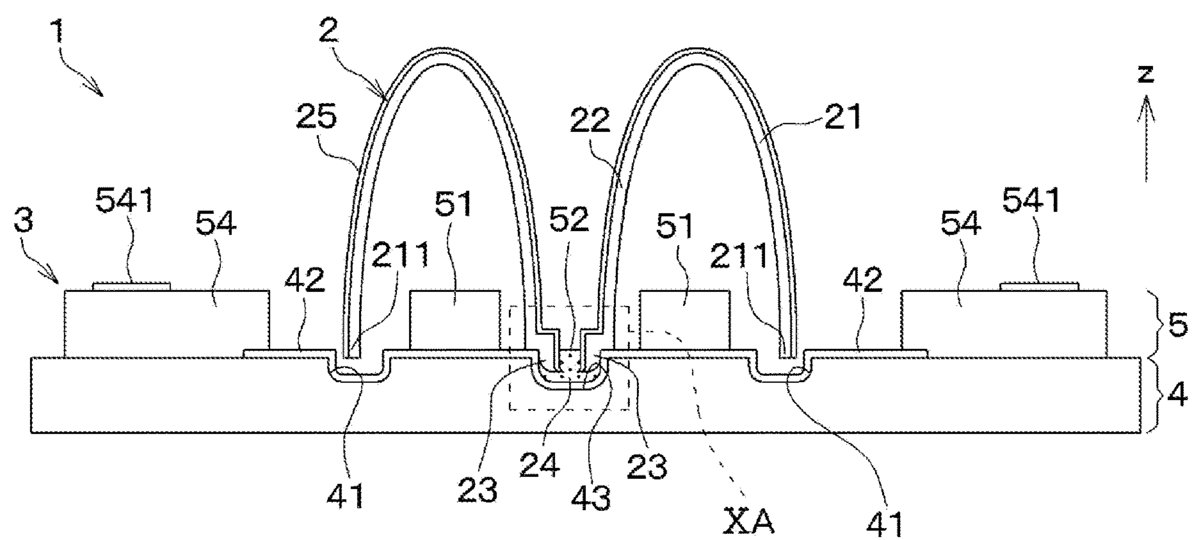
FIG. 9 is a cross-sectional view showing a configuration of a cross-section taken along a line IX-IX in FIG. 1.

The inner frame portion 51 has, for example, an annular shape when viewed from the upper side, but is not limited to this shape. The inner frame portion 51 may have a frame shape surrounding the positioning recess 43. As shown in FIGS. 8 and 9, for example, the inner frame portion 51 has dimensions such that its outer diameter and its inner diameter and do not come into contact with the micro vibration body 2.

The plurality of electrode portions 53 are arranged apart from each other so as to surround the inner frame portion 51 at the position on the radially outer side of an etching groove 41. As shown in FIG. 5, for example, the plurality of electrode portions 53 have arcuate sides on the inner peripheral side and the outer peripheral side when viewed from the upper side. When the inner peripheral side and the outer peripheral side of the electrode portions 53 are connected to each other, intermittent circles with different diameters are drawn. In other words, the plurality of electrode portions 53 have a configuration such that an annulus surrounding the inner frame portion 51 is evenly divided at predetermined intervals.

Figure 6:
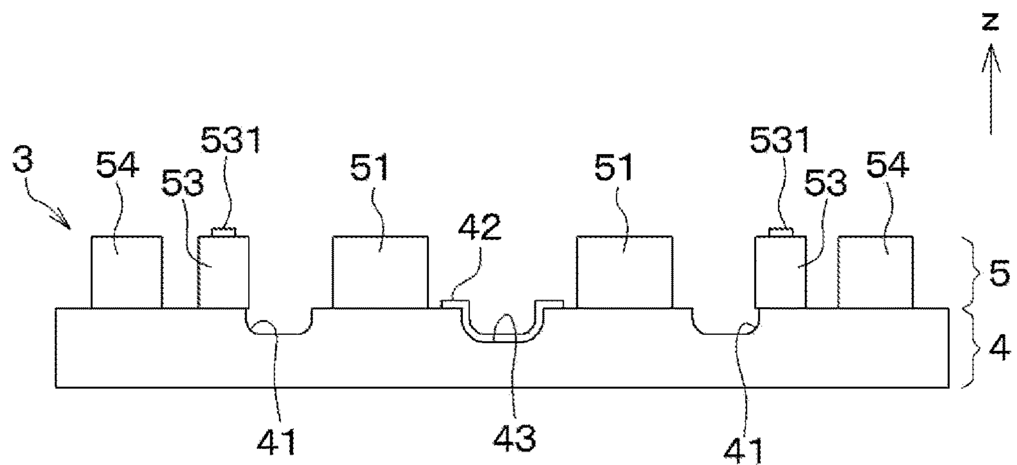
FIG. 6 is a cross-sectional view showing a configuration of a cross-section taken along a line VI-VI in FIG. 5.

As shown in FIG. 6, for example, each of the plurality of electrode portions 53 has an electrode film 531 formed on the upper surface thereof. For example, a wire (not shown) is connected to the electrode film 531, and the plurality of electrode portions 53 are electrically connected to an external circuit board (not shown) to enable control of the potential. As shown in FIGS. 1 and 8, for example, when the micro vibration body 2 is mounted, the plurality of electrode portions 53 are in a state of being separated from the rim 211 of the micro vibration body 2 by a predetermined distance, and each of the plurality of electrode portions 53 forms a capacitor with the micro vibration body 2. That is, the mounting substrate 3 is configured to detect the capacitance with the micro vibration body 2 via the plurality of electrode portions 53 and to generate an electrostatic attractive force with the micro vibration body 2 to enable to vibrate the micro vibration body 2 in the wine glass mode.

In the top view as shown in FIG. 5, the "inner peripheral side" of the mounting substrate 3 means an inner region surrounded by the inner frame portion 51 on the central side, and the "outer peripheral side" of the mounting substrate 3 means the side located opposite to the inner peripheral side. Further, FIG. 1 and the like show an example in which the electrode portions 53 of 16 elements are evenly arranged on the mounting substrate 3 and are separated from each other so as to form a ring, but the present disclosure is not limited to this example. The number and the arrangement of the electrode portions 53 may be appropriately modified according to the shape and the size of the micro vibration body 2.

Figure 7:
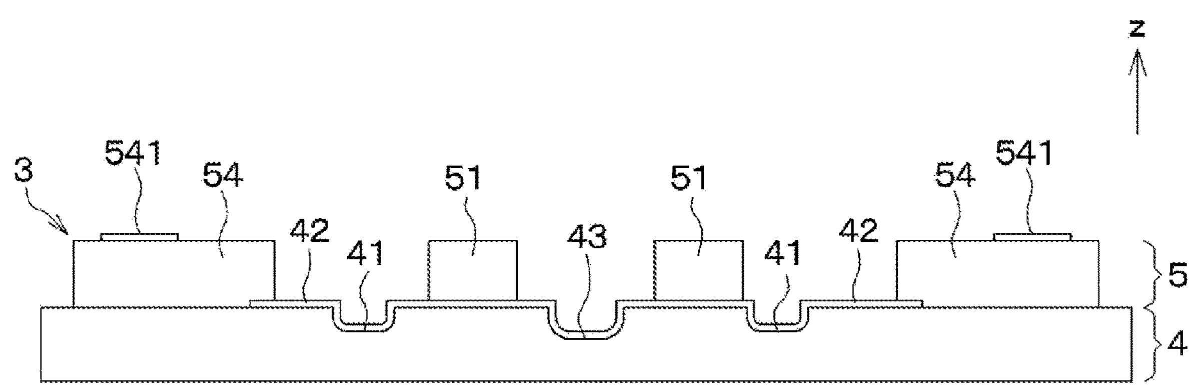
FIG. 7 is a cross-sectional view showing a configuration of a cross-section taken along a line VII-VII in FIG. 5.

The outer frame portion 54 has a single frame shape surrounding the inner frame portion 51 in the top view and is provided with an electrode film 541, which are formed of Al or the like on the upper surface, for example, as shown in FIGS. 5 and 7. A wire (not shown) is connected to the electrode film 541, and the outer frame portion 54 is electrically connected to the external circuit board or the like (not shown). As a result, the potential of the outer frame portion 54 can be controlled by an external power source (not shown) or the like.

In the mounting substrate 3, an annular etching groove 41 surrounding the inner frame portion 51 is formed at a position on the outer peripheral side of the annular-shaped inner frame portion 51 in the lower substrate 4 when viewed from the upper side. As a result, when the micro vibration body 2 is mounted on the mounting substrate 3, the curved surface portion 21 including the rim 211 of the micro vibration body 2 becomes hollow, as shown in FIGS. 8 and 9, for example. Further, in the mounting substrate 3, the positioning recess 43 used for joining with the micro vibration body 2 is formed in the inner region of the lower substrate 4 surrounded by the inner frame portion 51.

The mounting substrate 3 is provided with a bridge wiring 42 that straddles the etching groove 41 of the lower substrate 4 and covers a part or all of the inner wall and the bottom surface of the positioning recess 43. The bridge wiring 42 is formed of a conductive material such as Al (aluminum) and is arranged to pass between the plurality of electrode portions 53. The bridge wiring 42 is electrically independent of the plurality of electrode portions 53. The bridge wiring 42 is, for example, partially extended toward the outer frame portion 54 from the positioning recess 43 as the center. An extended end portion of the bridge wiring 42 is covered with the outer frame portion 54. As shown in FIG. 9, for example, a portion of the bridge wiring 42 covering the positioning recess 43 is electrically connected to the conductive layer 25 of the micro vibration body 2 via the joining member 52. That is, the bridge wiring 42 serves to electrically connect the outer frame portion 54 with the conductive layer 25 of the micro vibration body 2 such that the outer frame portion 54 and the conductive layer 25 are at the same potential. As a result, the potential of the micro vibration body 2 is controlled by adjusting the potential of the outer frame portion 54.

As shown in FIG. 9, the inner frame portion 51 covers the bridge wiring 42 and is at the same potential as the conductive layer 25 via the bridge wiring 42 and the joining member 52. However, it may be sufficient that at least the conductive layer 25 and the outer frame portion 54 are at the same potential, and the present disclosure is not limited to this example. For example, the inner frame portion 51 may have an intermittent frame shape that is partially divided in a top view and is arranged so as not to abut on the bridge wiring 42 and may be at a potential different from that of the bridge wiring 42 and the conductive layer 25.

As shown in FIGS. 8 and 9, for example, the positioning recess 43 is a bottomed groove into which the bottom surface protruding portion 23 of the micro vibration body 2 is inserted. For example, the inner diameter of the positioning recess 43 is set to be slightly larger than the external dimension of the bottom surface protruding portion 23 of the micro vibration body 2. The inner wall and the bottom surface of the positioning recess 43 is, for example, partially or wholly covered with the bridge wiring 42. The bottom surface protruding portion 23 of the micro vibration body 2 is inserted into the positioning recess 43, thereby to enable to easily and highly accurately position the micro vibration body 2 with respect to the mounting substrate 3. Further, when the bottom surface protruding portion 23 of the micro vibration body 2 is inserted into the positioning recess 43 of the mounting substrate 3, the region around the positioning recess 43 abuts on the bottom surface 22*b*, thereby to restrict the micro vibration body 2 from tilting.

Figure 10A:
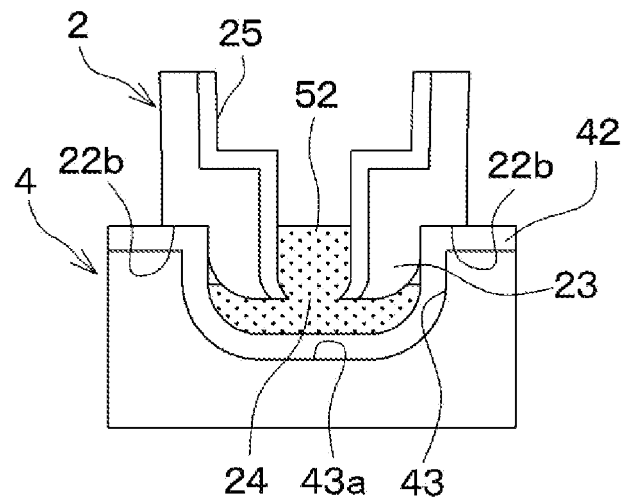
FIG. 10A is a cross-sectional view showing a configuration of a cross-section taken along a line XA-XA in FIG. 9.

As shown in FIG. 10A, for example, the positioning recess 43 has a dimension in the z direction, that is, the depth, which is larger than the height of the bottom surface protruding portion 23 shown in FIG. 3. That is, the positioning recess 43 has a dimension such that the positioning recess 43 is distant from a tip end surface 23*b* of the bottom surface protruding portion 23 when the micro vibration body 2 is joined. As a result, the tip end surface 23*b* of the bottom surface protruding portion 23 of the micro vibration body 2 and the positioning recess 43 do not come into contact with each other. In addition, the bottom surface 22*b* comes into contact with the region around the positioning recess 43 in the mounting substrate 3, and the micro vibration body 2 is restricted from tilting with respect to the mounting substrate 3. As a result, the micro vibration body 2 is in a mounted state in which a variation in the distance between the rim 211 and the plurality of electrode portions 53 of the mounting substrate 3 is reduced, that is, a variation in the capacitance is reduced. It may be sufficient for the positioning recess 43 that the bottom surface protruding portion 23 does come into contact with a bottom surface 43*a* or the bridge wiring 42 covering the bottom surface 43*a*. The depth of the positioning recess 43 is appropriately changed according to the height h1 of the bottom surface protruding portion 23.

Figure 10B:
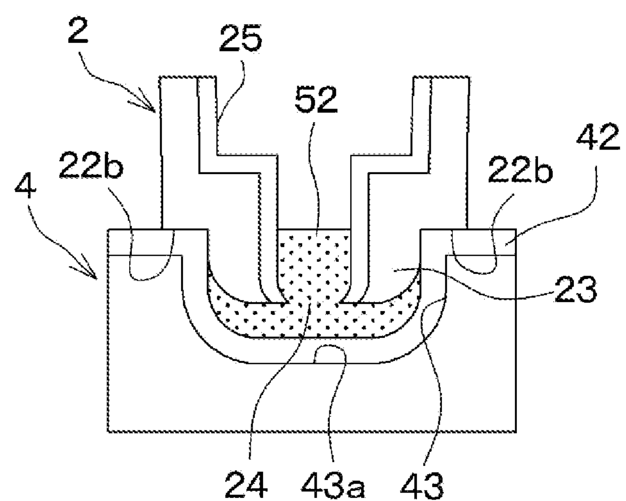
FIG. 10B is a view corresponding to FIG. 10A and is an enlarged cross-sectional view showing another example of a filling of the joining member.

The joining member 52 is not limited to the configuration in which the joining member 52 fills a part of the positioning recess 43. From the viewpoint of further improving the bonding strength between the micro vibration body 2 and the mounting substrate 3, for example, as shown in FIG. 10B, the joining member 52 may fill the entirety of the positioning recess 43. The amount of the joining member 52 may be sufficient as long as the joining member 52 flows from the positioning recess 43 into the through hole 24 of the micro vibration body 2 and comes into contact with the conductive layer 25. The amount of the joining member 52 may be appropriately changed.

The mounting substrate 3 may be manufactured by, for example, the following process.

First, for example, the lower substrate 4 made of borosilicate glass is prepared. The annular etching groove 41 and the positioning recess 43 in a region surrounded by the etching groove 41 are formed by wet etching using buffered hydrofluoric acid. After that, the bridge wiring 42 that straddles the etching groove 41 and covers the inner wall and the bottom surface of the positioning recess 43 is formed by, for example, a lift-off method using film formation by sputtering Al. The thickness of the bridge wiring 42 is, for example, about 0.1 μm.

Subsequently, for example, a Si substrate made of Si (later the upper substrate 5) is prepared and is an anode-bonded to the lower substrate 4 of the borosilicate glass. Next, grooves for partitioning a region to be the inner frame portion 51, a region to be the plurality of electrode portions 53, and a region to be the outer frame portion 54 are formed on the Si substrate by a known etching method.

Specifically, for example, trench etching is performed by DRIE (Deep Reactive Ion Etching) to expose the lower substrate 4 and to divide the region to be the inner frame portion 51, the region to be the plurality of electrode portions 53, and the region to be the outer frame portion 54 from each other. As a result, the Si substrate becomes the upper substrate 5 including the inner frame portion 51, the plurality of electrode portions 53, and the outer frame portion 54, which are separated from each other. Further, the etching groove 41 and the positioning recess 43 formed in the lower substrate 4 are exposed from the upper substrate 5 by the dividing process of the Si substrate.

Finally, for example, the electrode films 531 and 541 are formed on the upper surfaces of the plurality of electrode portions 53 and the outer frame portion 54 by sputtering or the like. As a result of the process, the mounting substrate 3 having the above-described structure can be obtained. Then, when the micro vibration body 2 is mounted on the mounting substrate 3, the joining member 52 is provided in the positioning recess 43 of the lower substrate 4. The joining member 52 is, for example, a paste-like conductive material having a conductive material such as AuSn (gold tin), Ag (silver), Au, or the like, and is applied into the positioning recess 43 using a syringe or the like.

The single mounting substrate 3 shown in FIG. 5 or the like can be obtained, for example, by forming regions to be a plurality of mounting substrates 3 each having the above structure on a wafer and separating the plurality of mounting substrates 3 into pieces by dicing cut or the like. In other words, the mounting substrate 3 can be manufactured at a wafer level.

The above is the basic configuration of the inertial sensor 1. At the time of driving, the inertial sensor 1 causes the micro vibration body 2 to vibrate in the wine glass mode by generating an electrostatic attraction between a part of the plurality of electrode portions 53 and the micro vibration body 2. In the inertial sensor 1, when the Coriolis force is applied from the outside when the micro vibration body 2 is in the vibrating state, the micro vibration body 2 is displaced and the position of a node of the vibration mode changes. The inertial sensor 1 is configured to detect the angular velocity acting on the inertial sensor 1 by detecting the change in the node of the vibration mode according to the capacitance between the micro vibration body 2 and the plurality of electrode portions 53.

[Manufacturing Method of Inertial Sensor]

Next, the manufacturing method of the inertial sensor 1 of the present embodiment will be described with reference to FIGS. 11A to 11E. Since the manufacturing of the micro vibration body 2 and the mounting substrate 3 has been described above, the process of joining the micro vibration body 2 to the mounting substrate 3 will be mainly described here.

FIGS. 11A to 11E correspond to the cross-sectional view shown in FIG. 8. Further, in FIGS. 11C to 11E, for easy viewing, only a part of a pickup mechanism 300, which will be described later, is briefly shown, and the inside of a collet 302 is shown by a broken line.

Figure 11A:
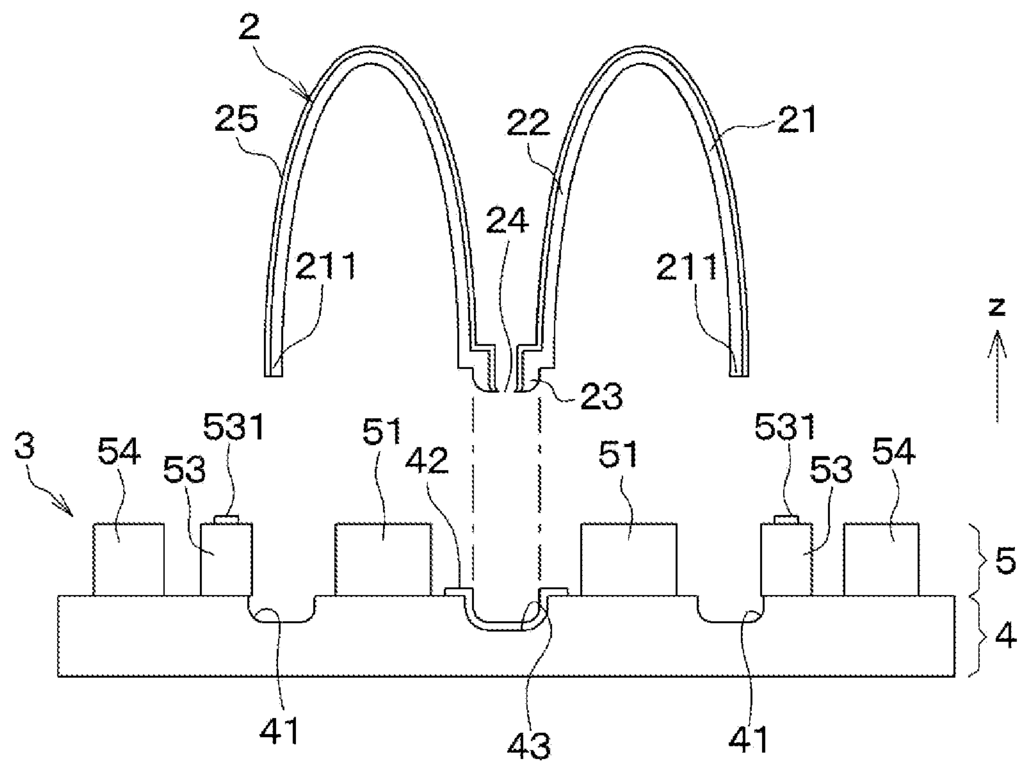
FIG. 11A is a view showing a mounting process of the micro vibration body in the manufacturing of the inertial sensor and is a view showing a process of preparing members.
Figure 11B:
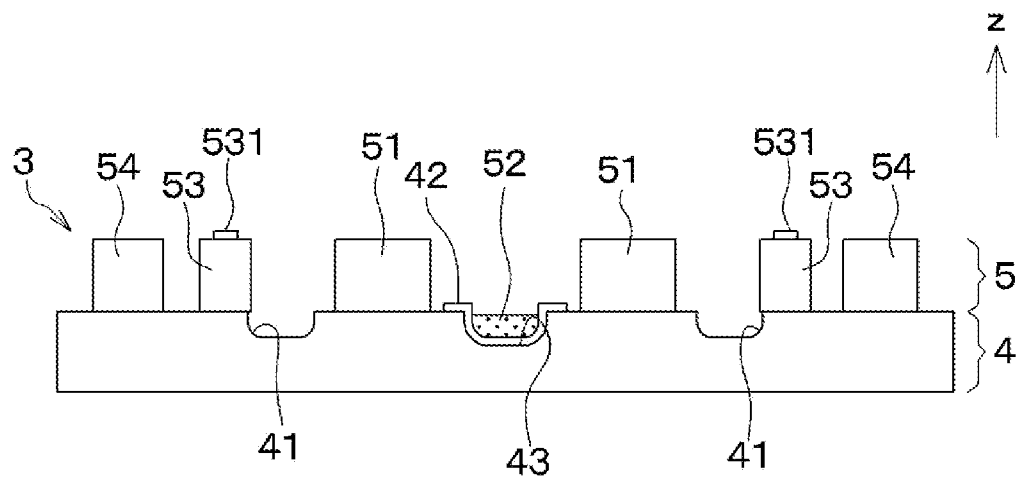
FIG. 11B is a view showing a process following the process of FIG. 11A.

First, as shown in FIG. 11A, for example, the micro vibration body 2 and the mounting substrate 3 manufactured by the above method are prepared. Then, for example, as shown in FIG. 11B, the joining member 52 is provided in the positioning recess 43. As the joining member 52, for example, a conductive joining material such as Au paste or Ag paste is used, and the joining member 52 is provided by coating with a syringe or the like.

Then, for example, the mounting substrate 3 is placed on a suction surface of a mounter device (not shown), and the mounting substrate 3 is fixed by vacuum suction. The mounter device (not shown) is provided with a heating mechanism configured to heat the suction surface.

Figure 11C:
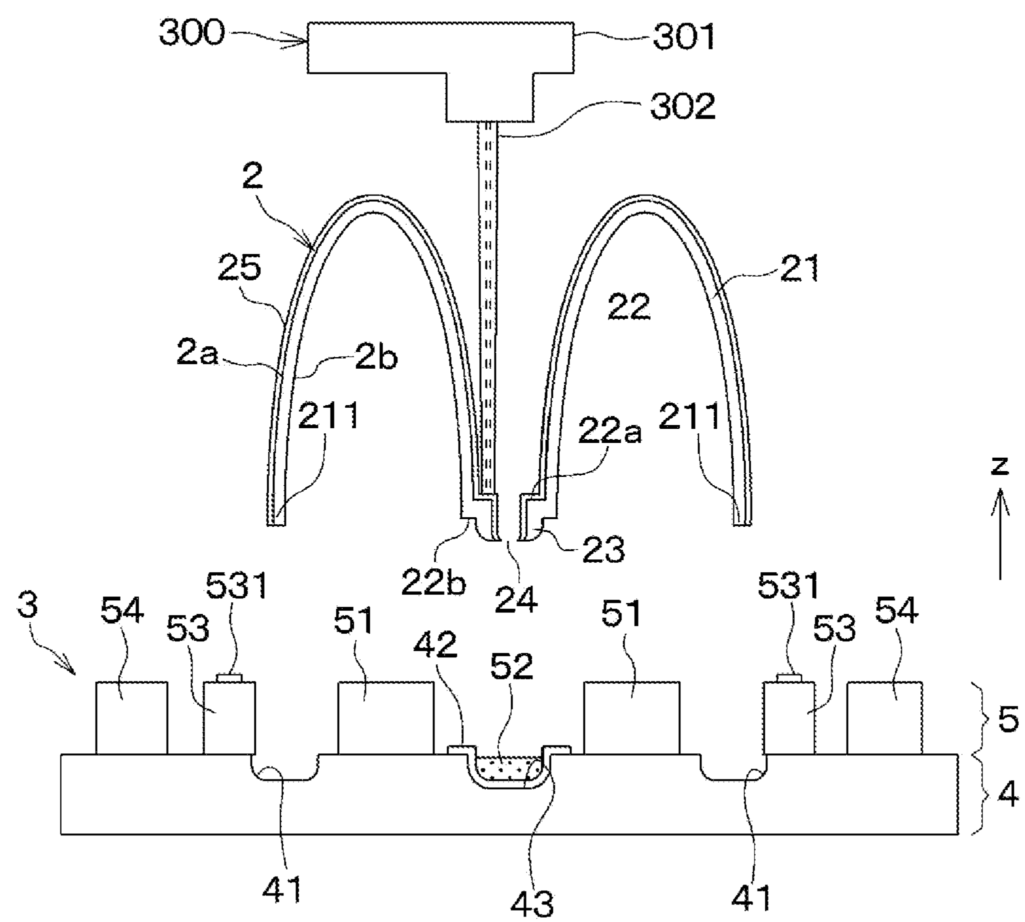
FIG. 11C is a view showing a process following the process of FIG. 11B.

Subsequently, for example, as shown in FIG. 11C, a part of the pickup mechanism 300 is inserted into a bottom portion 22*a* of the recessed portion 22 of the micro vibration body 2 on the side of the front surface 2*a*, and the micro vibration body 2 is gripped by vacuum suction. The pickup mechanism 300 includes, for example, a pedestal portion 301 and the collet 302 having a substantially cylindrical shape. The pedestal portion 301 is connected to a convey portion and a vacuum mechanism (not shown). The pickup mechanism 300 is configured to perform the vacuum suction by the collet 302 and conveying of the sucked object. In the pickup mechanism 300, for example, the maximum diameter of the collet 302 is smaller than the inner diameter of the recessed portion 22, and the outer diameter of the tip end portion of the collet 302 is smaller than the other portions. Further, in the pickup mechanism 300, the length of the collet 302 is larger than the depth of the recessed portion 22 of the micro vibration body 2. When the collet 302 is inserted into the recessed portion 22 of the micro vibration body 2, the collet 302 is configured not come into contact with a portion of the micro vibration body 2 other than the bottom portion 22*a* of the micro vibration body 2. As a result, this configuration enables to prevent the conductive layer 25 and the base material of the micro vibration body 2 from being scratched when the micro vibration body 2 is conveyed.

Figure 11D:
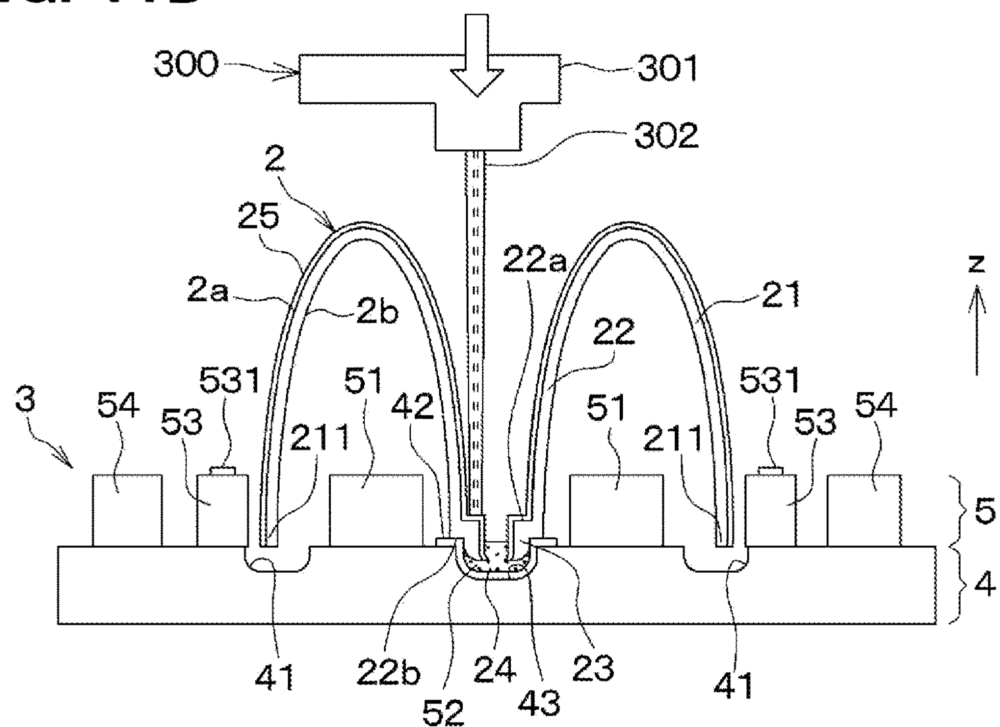
FIG. 11D is a view showing a process following the process of FIG. 11C.

On the other hand, the mounting substrate 3 is heated in a state of being sucked by a mounter device (not shown) to melt or soften the joining member 52. Then, for example, as shown in FIG. 11D, the bottom surface protruding portion 23 of the micro vibration body 2 is inserted into the positioning recess 43 of the mounting substrate 3, while the bottom portion 22*a* of the micro vibration body 2 is gripped by vacuum suction using the pickup mechanism 300 described above. As a result, an effect can be produced such that the positioning of the micro vibration body 2 with respect to the mounting substrate 3 can be performed easily and with high accuracy. At the same time, an effect can be produced such that the positional deviation of the micro vibration body 2 caused subsequently in the in-plane direction, that is, on the x-y plane can be restricted.

Subsequently, the micro vibration body 2 is brought closer toward the mounting substrate 3, and the tip end surface 23*b* of the micro vibration body 2 is brought into contact with the joining member 52. As a result, a part of the melted joining member 52 enters the through hole 24 of the micro vibration body 2 and comes into contact with the conductive layer 25 covering the front surface 2*a*. Further, since the tip end surface 23*b* of the bottom surface protruding portion 23 does not abut on the positioning recess 43, the micro vibration body 2 is restricted from tilting with respect to the mounting substrate 3.

The alignment of the micro vibration body 2 with respect to the mounting substrate 3 may be made such that the micro vibration body 2 and the mounting substrate 3 are imaged, and feature points are extracted by edge detection by a known image processing technique, thereby to adjust the relative position.

Further, as described above, the positioning recess 43 has the inner diameter corresponding to the outer diameter of the bottom surface protruding portion 23 of the micro vibration body 2. Therefore, in addition to adjusting the relative position between the micro vibration body 2 and the mounting substrate 3 using image processing technology, by fitting the micro vibration body 2 to the positioning recess 43, the configuration enables to easily and highly accurately secure the positioning accuracy of the micro vibration body 2 with respect to the mounting substrate 3.

Figure 11E:
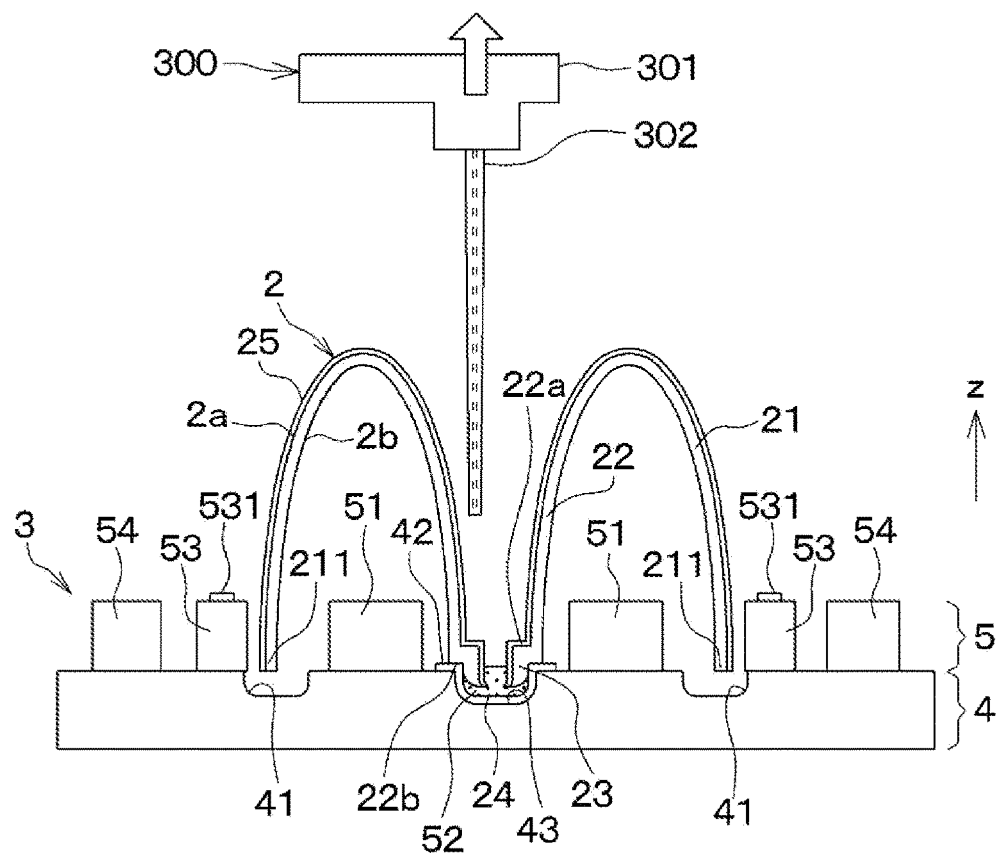
FIG. 11E is a view showing a process following the process of FIG. 11D.

After that, the temperature of the suction surface of the mounter device (not shown) is lowered, and the molten joining member 52 is solidified to join the micro vibration body 2 with the mounting substrate 3. Then, for example, as shown in FIG. 11E, the inside of the collet 302 is returned to normal pressure to release the vacuum suction of the micro vibration body 2, the pickup mechanism 300 is retracted, and the collet 302 is pulled out from the recessed portion 22 of the micro vibration body 2.

Subsequently, the suction by the mounter device or the like (not shown) is released, and the mounting substrate 3 to which the micro vibration body 2 is joined is removed from the suction surface. Then, the mounting substrate 3 is mounted on a circuit board or the like (not shown), and wire bonding is performed to the electrode films 531 and 541 of the mounting substrate 3. In this way, the circuit board and the like, the electrode portion 53, and the outer frame portion 54 of the mounting substrate 3 are electrically connected to each other. Finally, for example, a cap member (not shown) is attached to the mounting substrate 3 or to an external member to which the mounting substrate 3 is mounted in a vacuum environment, and the micro vibration body 2 is sealed tightly in an internal space which is formed by the mounting substrate 3 and the cap member (not shown). By such a process, the inertial sensor 1 according to the embodiment can be manufactured.

The above is the basic manufacturing method of the inertial sensor 1 of the present embodiment. Here, as a method of gripping the micro vibration body 2, the case where the bottom portion 22*a* of the recessed portion 22 is vacuum-sucked has been described as a typical example, but the method is not limited to this example. For example, the configuration of the collet 302 may be changed such that the side wall of the recessed portion 22 on the side of the front surface 2*a* may be gripped by vacuum suction, or the side wall may be gripped by mechanically pressing the side wall at two or more places.

According to this embodiment, the inertial sensor 1 has the configuration including the curved surface portion 21, the recessed portion 22, the bottom surface protruding portion 23, and the through hole 24 and in which the micro vibration body 2, in which only the front surface 2*a* is covered with the conductive layer 25, is mounted on the mounting substrate 3. This inertial sensor 1 has a configuration having the electrode film only on the side of the front surface 2*a*. Therefore, as compared with the configuration in which the entirety of the front surface and the back surface are covered with the electrode film, the coverage area of the thin-walled base material of the conductive layer 25 is small, and the effect of improving the Q factor of the micro vibration body 2 can be obtained. Further, the inertial sensor 1 according to the embodiment has the configuration in which the positioning recess 43 is provided on the mounting substrate 3, and the bottom surface protruding portion 23 of the micro vibration body 2 is inserted thereby to fix their relative positions. Therefore, the inertial sensor 1 has the configuration which enables positioning of the micro vibration body 2 with respect to the mounting substrate 3 more easily and with higher accuracy as compared with the case of simply performing positioning by an image processing technology.

Therefore, the inertial sensor 1 according to the embodiment has the configuration in which the Q factor of the micro vibration body 2 is large with high accuracy while facilitating the positioning of the micro vibration body 2 with high accuracy.

OTHER EMBODIMENTS

Although the present disclosure has been described in accordance with the examples, it is understood that the present disclosure is not limited to such examples or structures. The present disclosure also includes various modifications and modifications within an equivalent range. In addition, various combinations and modes, and further, other combinations and modes including one element of these alone, or thereabove, or therebelow, are also comprised within the scope or concept range of the present disclosure.

Figure 12:
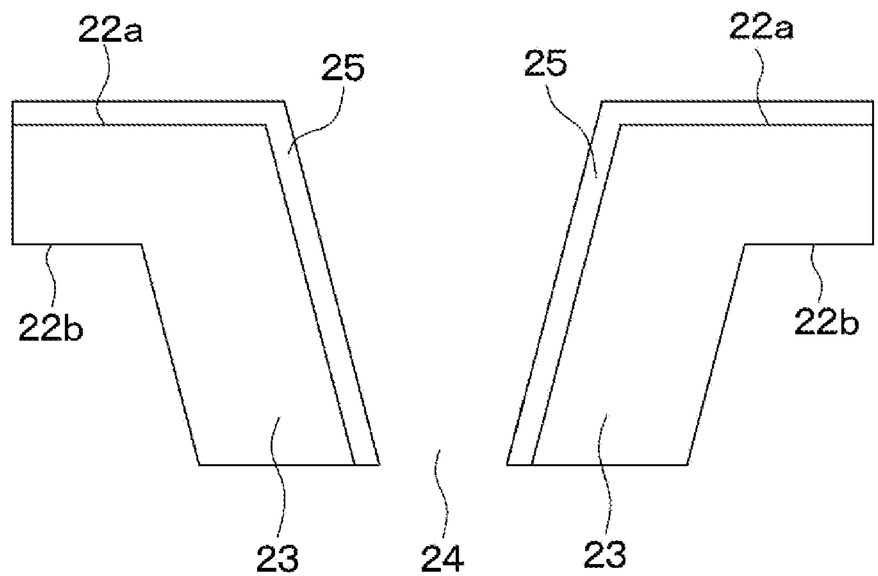
FIG. 12 is a cross-sectional view showing an example of another shape of the joint portion of the micro vibration body with the mounting substrate.

(1) For example, in the micro vibration body 2, as shown in FIG. 12, the bottom surface protruding portion 23 may have a tapered shape having an inclined surface such that the outer diameter of the tip end on the opposite side of the bottom surface 22*b* is smaller than the outer diameter of the end portion on the side of the bottom surface 22*b*. For example, the bottom surface protruding portion 23 may be formed into the tapered shape such that the height of the protrusion M21 of the mold M shown in FIG. 4A is increased, and the tip end of the protrusion M21 is formed thinner than the root of the protrusion M21.

Figure 13:
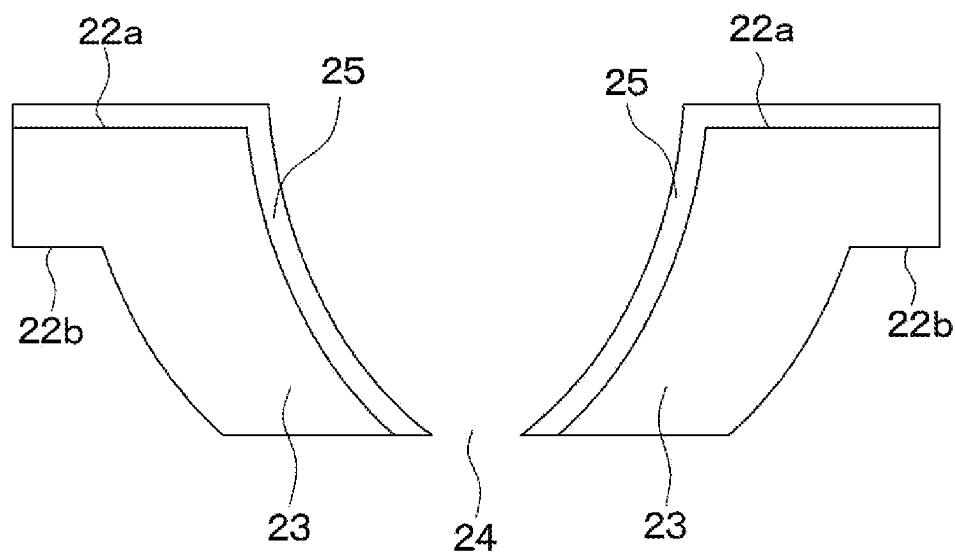
FIG. 13 is a cross-sectional view showing another example of another shape of the joint portion of the micro vibration body with the mounting substrate.

Further, as shown in FIG. 13, the micro vibration body 2 may be, for example, in a shape such that the outer surface of the bottom surface protruding portion 23 on the side of the back surface 2*b* is formed into a curved shape that is continuously curved from the bottom surface 22*b* toward the tip end surface 23*b*, and the outer diameter of the tip end becomes smaller. For example, the bottom surface protruding portion 23 may be formed into the curved shape such that the height of the protrusion M21 of the mold M shown in FIG. 4A is decreased, and the tip end of the protrusion M21 is formed thinner than the root of the protrusion M21.

With the configuration in which the outer shape of the bottom surface protruding portion 23 has the tapered shape or the curved shape as described above, the bottom surface protruding portion 23 can be easily inserted, even in a case where the outer diameter of the bottom surface protruding portion 23 on the side of the bottom surface 22*b* is slightly larger than the inner diameter of the positioning recess 43 due to a dimensional error or the like. As a result, the micro vibration body 2 has a shape such that the bottom surface 22*b* of the recessed portion 22 is steadily in contact with the mounting substrate 3, and an effect of more stable positioning with respect to the mounting substrate 3 can be produced. It should be noted that FIGS. 12 and 13 are enlarged views showing a region of the micro vibration body 2 including the bottom surface protruding portion 23 and a part of the bottom surface protruding portion 23 and the recessed portion 22 in the vicinity of the bottom surface protruding portion 23. FIGS. 12 and 13 are enlarged cross-sectional views in which the other configuration is omitted for easy viewing. The same applies to FIG. 14.

As described above, it may be sufficient that the micro vibration body 2 has the bottom surface protruding portion 23 that can be inserted into the positioning recess 43, and that the tip end surface 23*b* does not abut on the positioning recess 43. The shape of the bottom surface protruding portion 23 may be changed as appropriate. For example, the bottom surface protruding portion 23 is not limited to the tapered shape, the curved shape, and/or the like. The bottom surface protruding portion 23 may have a substantially cylindrical shape extending along the normal direction with respect to the bottom surface 22*b*, that is, extending toward the lower side in the z direction.

Figure 14:
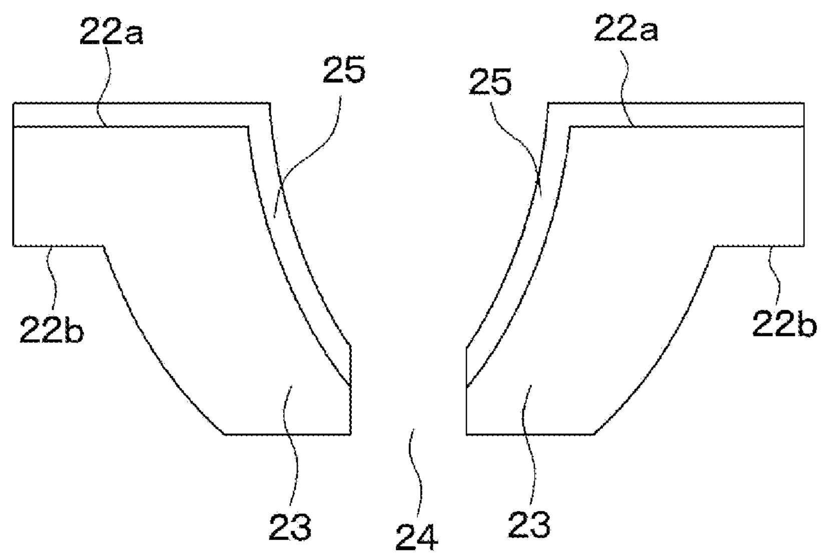
FIG. 14 is a cross-sectional view showing another example of another shape of the joint portion of the micro vibration body with the mounting substrate.

(2) The conductive layer 25 may cover a part of or the entirety of the inner wall of the through hole 24, as shown in FIGS. 3 and 12. The conductive layer 25 may not cover the inner wall of the through hole 24 as shown in FIG. 14. In the former case, at least a part of the conductive layer 25 is extended so as to connect the upper end of the inner wall of the through hole 24 on the side of the front surface 2*a* with the lower end of the inner wall of the through hole 24 on the side of the tip end surface 23*b*, thereby to enable to steadily in contact with the joining member 52 when the micro vibration body 2 is joined. As a result, the effect that the electrical connection between the micro vibration body 2 and the mounting substrate 3 is more stable can be produced.

Figure 15:
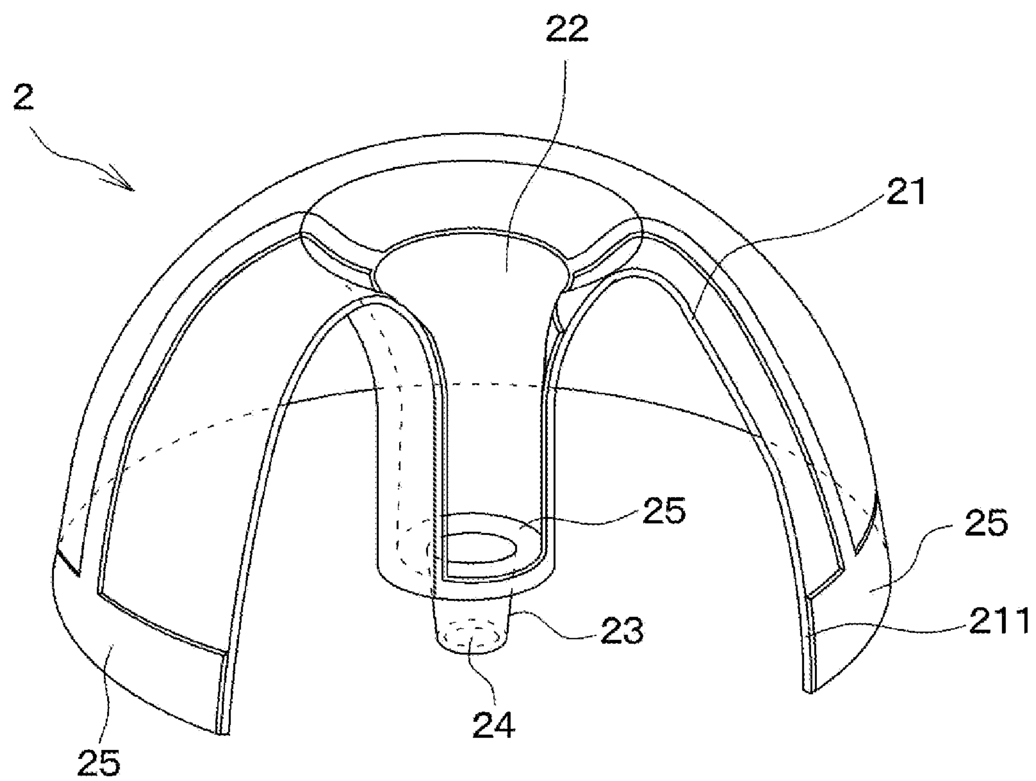
FIG. 15 is a perspective view showing another example of formation of a conductive layer in the micro vibration body.

Further, it may be sufficient that the conductive layer 25 at least covers the front surface 2*a* of the rim 211 facing the plurality of electrode portions 53 of the mounting substrate 3 and the inner wall surface of the bottom surface protruding portion 23 and electrically connect therebetween. The conductive layer 25 may not necessarily cover the entirety of the front surface 2*a*. As shown in FIG. 15, for example, the conductive layer 25 may have a pattern shape that covers only a part of the front surface 2*a*. For example, the conductive layer 25 may have a pattern shape in which a portion covering the rim 211 and a portion covering the inner wall surfaces of the recessed portion 22 and the bottom surface protruding portion 23 are connected with each other via a narrow portion. In this case, the covering area of the base material of the micro vibration body 2 by the conductive layer 25 is further reduced, such that the micro vibration body 2 has a configuration in which the decrease in the Q factor is further suppressed.

The micro vibration body 2 including the conductive layer 25 having the above-described pattern shape may be formed by, for example, preparing the flat quartz plate 20 shown in FIG. 4A, which is formed with the conductive layer 25 having the pattern shape on the side of the recessed portion M1, and by performing the process of FIGS. 4B to 4E. In FIG. 15, in order to facilitate understanding of the example of the pattern shape of the conductive layer 25 constituting the micro vibration body 2, a part of the curved surface portion 21 of the micro vibration body 2 is omitted, and similarly to FIG. 2, the outer shell of the portion that cannot be seen at the angle shown in FIG. 15 is shown by a broken line.

What is claimed is:

1. An inertial sensor comprising:

a micro vibration body that is a walled member having a front surface, which is a surface on a side having an outer diameter, and a back surface, which is an opposite surface to the front surface, the micro vibration body including a curved surface portion, which has an annular curved surface, a recessed portion, which is recessed from the curved surface portion to a center of the micro vibration body, a bottom surface protruding portion, which protrudes from a bottom surface of the recessed portion on a side of the back surface, a through hole, which is in the bottom surface protruding portion and communicates the front surface with the back surface, and a conductive layer, which covers at least a part of the front surface;

a mounting substrate that includes a lower substrate and an upper substrate, which are joined to each other, the lower substrate having a positioning recess into which the bottom surface protruding portion of the micro vibration body is inserted, the upper substrate including an inner frame portion, which surrounds a periphery of the positioning recess, and a plurality of electrode portions, which are separated from each other and surround the inner frame portion; and a joining member that is provided in the positioning recess and joins the bottom surface protruding portion of the micro vibration body with the mounting substrate, wherein the curved surface portion of the micro vibration body is hollow, the bottom surface is in contact with a region of the mounting substrate around the positioning recess, a tip end of the bottom surface protruding portion has a tip end surface distal to the bottom surface, the positioning recess is spaced apart from the tip end surface, and the joining member at least partially enters the through hole and is electrically connected to the conductive layer.

2. The inertial sensor according to claim 1, wherein the conductive layer covers at least a part of an inner wall of the through hole, the inner wall of the through hole includes an upper end at the front surface and a lower end at the back surface, and the conductive layer extends, such that at least a part of the conductive layer connects the upper end of the inner wall of the through hole with the lower end of the inner wall of the through hole.

3. The inertial sensor according to claim 1, wherein the conductive layer covers at least the front surface of a rim of the micro vibration body, which faces the plurality of the electrode portions, and the conductive layer covers only a side of the front surface.

4. The inertial sensor according to claim 1, wherein the joining member fills a part of the positioning recess.

5. The inertial sensor according to claim 1, wherein the bottom surface protruding portion has a tapered shape or a curved shape, such that an outer diameter of a tip end of the bottom surface protruding portion is smaller than an outer diameter of a bottom end of the bottom surface protruding portion.

* * * * *